(12) United States Patent
Nauka et al.

(10) Patent No.: US 11,338,510 B2
(45) Date of Patent: May 24, 2022

(54) BUILD MATERIAL DISTRIBUTING CYLINDERS

(71) Applicant: HEWLETT-PACKARD DEVELOPMENT COMPANY, L.P., Spring, TX (US)

(72) Inventors: Krzysztof Nauka, Palo Alto, CA (US); Thomas Anthony, Palo Alto, CA (US); Kristopher J. Erickson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,285

(22) PCT Filed: Jun. 8, 2018

(86) PCT No.: PCT/US2018/036670
§ 371 (c)(1),
(2) Date: Oct. 18, 2019

(87) PCT Pub. No.: WO2019/236102
PCT Pub. Date: Dec. 12, 2019

(65) Prior Publication Data
US 2021/0331391 A1  Oct. 28, 2021

(51) Int. Cl.
*B29C 64/218* (2017.01)
*B33Y 30/00* (2015.01)
*B33Y 40/00* (2020.01)
*B33Y 50/02* (2015.01)
*B29C 64/321* (2017.01)
(Continued)

(52) U.S. Cl.
CPC .......... *B29C 64/218* (2017.08); *B29C 64/241* (2017.08); *B29C 64/295* (2017.08); *B29C 64/321* (2017.08); *B29C 64/393* (2017.08); *B33Y 30/00* (2014.12); *B33Y 40/00* (2014.12); *B33Y 50/02* (2014.12)

(58) Field of Classification Search
CPC ... B29C 64/218; B29C 64/321; B29C 64/295; B29C 64/393; B29C 64/241; B33Y 30/00; B33Y 40/00; B33Y 50/02
USPC ....................................................... 425/143
See application file for complete search history.

(56) References Cited

U.S. PATENT DOCUMENTS 5,934,343 A  8/1999 Gaylo et al.
6,676,892 B2  1/2004 Das et al.
(Continued)

FOREIGN PATENT DOCUMENTS

WO  WO2017208145 A1  12/2017

*Primary Examiner* — Joseph S Del Sole
*Assistant Examiner* — Lawrence D. Hohenbrink, Jr.
(74) *Attorney, Agent, or Firm* — Fabian VanCott

(57) ABSTRACT

A three-dimensional (3D) printing device includes a first cylinder. The first cylinder may include a first plurality of holes defined therein. The 3D printing device may include a second cylinder interior and coaxial to the first cylinder that includes a second plurality of holes open to an interior of the first cylinder. The 3D printing device may also include a third cylinder interior to the first cylinder and exterior to the second cylinder, the third cylinder including a longitudinal cutout open to the first cylinder. The 3D printing device may include a supply tube open to the second cylinder, the supply tube to provide an amount of build material to an interior portion of the second cylinder.

20 Claims, 6 Drawing Sheets

(51) Int. Cl.
*B29C 64/295* (2017.01)
*B29C 64/393* (2017.01)
*B29C 64/241* (2017.01)

(56) References Cited

U.S. PATENT DOCUMENTS

| | | |
|---|---|---|
| 7,887,316 B2 | 2/2011 | Cox |
| 9,573,193 B2 | 2/2017 | Buller et al. |
| 9,610,735 B2 | 4/2017 | Yoo et al. |
| 2008/0241404 A1 | 10/2008 | Allaman et al. |
| 2016/0221360 A1 | 8/2016 | Till |
| 2017/0072636 A1* | 3/2017 | Ng .................... B29C 31/02 |
| 2017/0173879 A1 | 6/2017 | Myerberg et al. |

* cited by examiner

BUILD MATERIAL DISTRIBUTING CYLINDERS

BACKGROUND

Additive manufacturing systems produce three-dimensional (3D) objects by building up layers of material and combining those layers using adhesives, heat, chemical reactions, and other coupling processes. Some additive manufacturing systems may be referred to as "3D printers." 3D printers and other additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

DETAILED DESCRIPTION

Figure 1:
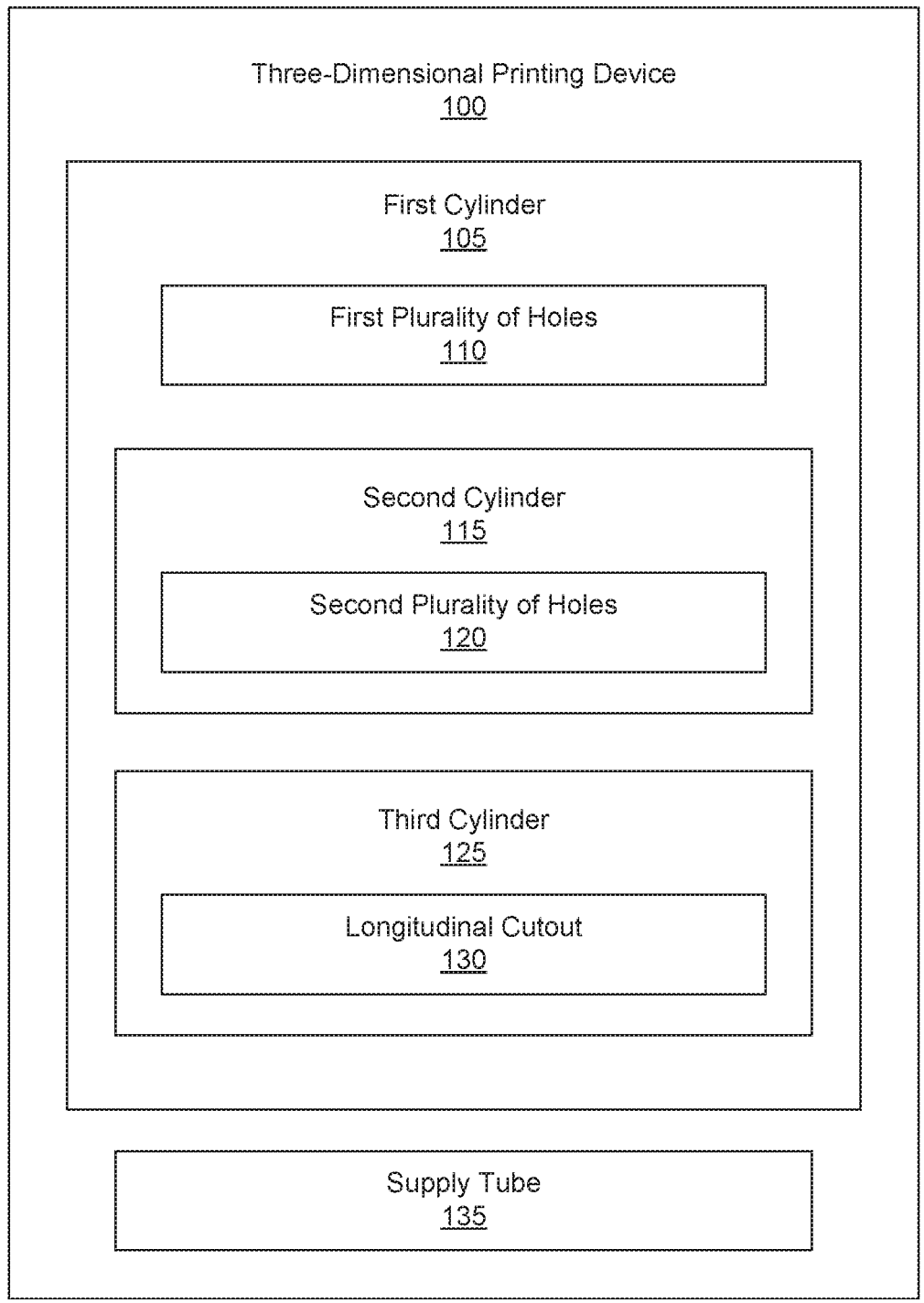
FIG. 1 is a block diagram of a three-dimensional (3D) printing device according to an example of the principles described herein.

Some additive manufacturing systems such as three-dimensional (3D) printing systems use build material that have a powdered or granular form. In these examples, the build material may include a semi-crystalline thermoplastic material, metals, plastics, ceramics, glass, composites, resins, graphene-embedded plastics, polymers, photopolymers, thermoplastics, other build materials, and combinations thereof. Different build materials may have different characteristics, such as different average particle sizes, different minimum and maximum particle sizes, different coefficients of friction, different angles of repose, other mechanical and physical properties, and combinations thereof. In other examples non-powdered build materials may be used such as, for example, gels, pastes, and slurries.

Some additive manufacturing systems may provide, from a hopper, a quantity of build material to be spread over the build platform to form a thin layer of build material on the build platform and/or a previously deposited layer of build material. The quantity of build material may be referred to herein as a "dose" of build material. Portions of the layer of build material may then be solidified, using any suitable solidification technique, such as a fusing agent deposition and heating systems, binder agent deposition systems, laser sintering systems, and other binding processes and techniques.

During an additive manufacturing operation, an initial layer of build material may be spread directly on the surface of a build platform, and subsequent layers of build material may be formed on a number of previously deposited and formed layers of build material. Herein, reference to forming a layer of build material on the build platform may refer, depending on the context, either to forming a layer of build material directly on the surface of the build platform, or to forming a layer of build material on a previously formed layer of build material.

In some additive manufacturing systems, some of the build material may not be uniformly distributed about the build platform. This non-uniformity may lead to poor-quality finished products or parts due to the density of the build material not being uniform throughout a spread layer of the build material. The non-uniformity may be from a front side to a back side and/or side to side of a build zone of the build platform and may be non-uniform as between successive layers of the build material. This may result, in an example, in the temperature of the deposited build material being non-uniform. This is because the build material may impart certain insulating characteristics to the solidification of the build material. In some examples, too much build material surrounding portions of the build material that is to be solidified may result in extra heat being imparted to those portions. Additionally, in some examples a non-flat surface of build material may lead to additional difficulties with spreading a subsequent layer thereover.

Further, in some additive manufacturing systems, excessive amounts of build material may be spread across the build platform. This may result in excessive cooling of both the spread material and the 3D object being formed. Cooling of the build material and the 3D object being formed on the build platform may cause successive layers of the 3D object from completely binding with one another. Consequently, even distribution and spreading of the build material will result in best formed and strongest 3D objects.

Still further, inconsistencies in the thickness of a layer of build material laid down onto a build platform may result in inconsistent or low 3D object density. Here, portions of the layer of build material formed on the build platform, when fused, will result in a low part density leading to printed 3D objects that have an inferior mechanical property than expected.

Still further, as the build material becomes more difficult to spread based upon the properties of the build material, the density of the build material at any given location on the build platform may be more inconsistent. Properties of build material that are relatively more difficult to spread include avalanche angles greater than 45 degrees and relatively larger granular sizes within the build material. These types of relatively more difficult build materials may be used since relatively smaller particle sizes of build material may fuse quicker than desired and the micronization methods used to make smaller particles may be cheaper but result in poor flow qualities. In some examples, the properties of the build material may be so difficult to spread with a blade or other type of spreading device that the build material may form patches or clumps on the surface of the build platform.

In another example, some additive manufacturing systems define a layer of build material by pushing a pile of build material across the build platform with a blade or roller. Distribution of build material in this manner produces a variable pile size along the path of the powder spreader which, in turn, may alter build material spreading characteristics. In addition, build material may be segregated by size as it is spread across the build platform from a single pile of build material. Variability in build material spreading can adversely affect consistency in properties of the 3D objects formed.

The present specification describes a roller that concurrently deposits and spreads build powder over a surface of a build platform. In an example, the roller may provide precise build material metering to the surface of the build platform as well as mixing and aeration of the powder prior to deposition of the build material.

The present specification describes a three-dimensional (3D) printing device that includes a first cylinder. The first cylinder may include a first plurality of holes defined therein. The 3D printing device may include a second cylinder interior and coaxial to the first cylinder that includes a second plurality of holes open to an interior of the first cylinder. The 3D printing device may also include a third cylinder interior to the first cylinder and exterior to the second cylinder, the third cylinder including a longitudinal cutout open to the first cylinder. The 3D printing device may include a supply tube open to the second cylinder, the supply tube to provide an amount of build material to an interior portion of the second cylinder.

The present specification also describes an additive manufacturing system that includes a build platform; a build material supply system; and a roller that includes a first cylinder including a first plurality of holes defined therein; a second cylinder interior and coaxial to the first cylinder including a second plurality of holes open to an interior of the first cylinder; and a third cylinder interior to the first cylinder and exterior to the second cylinder, the third cylinder including a longitudinal cutout open to the first cylinder; wherein the build material supply system delivers build material into an interior cavity of the second cylinder via a supply tube The present specification further describes a roller for a three-dimensional additive manufacturing system, that includes a replaceable first cylinder including a first plurality of holes defined therein; a second cylinder interior and coaxial to the first cylinder that includes a second plurality of holes open to an interior of the first cylinder; a third cylinder interior to the first cylinder and exterior to the second cylinder, the third cylinder including a longitudinal cutout open to the first cylinder wherein an edge of the longitudinal cutout is placed in a second quarter relative to the first cylinder; and a fourth cylinder comprising a fourth plurality of holes defined therein wherein the fourth cylinder is interior to and coaxial with the first cylinder and exterior to the third cylinder; wherein the build material supply system delivers build material into an interior cavity of the second cylinder via a supply tube.

Turning now to the figures, FIG. 1 is a block diagram of a three-dimensional (3D) printing device (100) according to an example of the principles described herein. The 3D printing device (100) may include a first cylinder (105). During use, the first cylinder (105) may be allowed to rotate along a longitudinal axis in either direction based on the direction the first cylinder (105) is traversing across a build platform onto which the build material is to be deposited and spread by the first cylinder (105). In any example presented herein, the first cylinder (105) may include a first plurality of holes (110) formed through the wall of the first cylinder (105) through which an amount of build material may be deposited onto a build platform. The number, the shape, and the area of the openings of first plurality of holes (110) may vary depending on the type of build material deposited by the first cylinder (105) during operation. Certain characteristics of the build material that may be taken into consideration may include the average particle sizes, the minimum and maximum particle sizes, the coefficients of friction, and the angles of repose, among other mechanical and physical properties, and combinations thereof.

In any example presented herein, the first cylinder (105) may be replaceable. In this example, a plurality of replacement first cylinders (105) may be selected and installed prior to operation of the 3D printing device (100). Replacement of the first cylinder (105) may be done based on those characteristics of the build material to be used with the 3D printing device (100) during the manufacture of a 3D object. The replacement first cylinders (105) may vary amongst themselves by the number, the shape, and the area of the openings of first plurality of holes (110) of each replacement first cylinder (105). Again, certain characteristics of the build material may be taken into consideration when selecting a replacement first cylinder (105) including the average particle sizes, the minimum and maximum particle sizes, the coefficients of friction, and the angles of repose, among other mechanical and physical properties, and combinations thereof.

The 3D printing device (100) may, in any example presented herein, include a second cylinder (115). The second cylinder (115) may include a second plurality of holes (120). During use, the second cylinder (115) may be allowed to rotate along a longitudinal axis in either direction. In an example, the second cylinder (115) may rotate in the same or different direction as the rotation of the first cylinder (105). In an example, the speed of rotation of the second cylinder (115) may be faster, slower, or similar to the speed of rotation of the first cylinder (105). In an example, the second cylinder (115) may not rotate.

The second plurality of holes (120) may be similar in area of opening, shape, and number of holes as the first plurality of holes (110). In any example presented herein, the shape of the second plurality of holes (120) may be different from the shape of the first plurality of holes (110). In any example presented herein, the area of the opening of the second plurality of holes (120) may be different from the first plurality of holes (110). In any example presented herein, the number of holes of the second plurality of holes (120) may be different from the first plurality of holes (110).

The second cylinder (115) may be placed interior and coaxial to the first cylinder (105). The second plurality of holes (120) may be open to an interior of the first cylinder (105) thereby allowing a build material to pass through the second plurality of holes (120), to the first plurality of holes (110) on the first cylinder (105) and through the first plurality of holes (110).

In any example presented herein, the 3D printing device (100) may include a third cylinder (125). The third cylinder (125) may be interior to the first cylinder (105) and exterior to the second cylinder (115). The third cylinder (125) may run coaxial to the first cylinder (105) and second cylinder (115). During use, the third cylinder (125) may be prevented from rotating along a longitudinal axis when the first cylinder (105) is depositing an amount of build material onto the build platform. In an example, the third cylinder (125) is allowed to selectively rotate in either a clockwise or counterclockwise direction based on the direction the first cylinder (105), second cylinder (115), and third cylinder (125) travel across the surface of the build platform. Details of the amount of the selective rotation or repositioning of the third cylinder (125) may be discussed in more detail in connection with FIGS. 4-6.

In any example presented herein, the third cylinder (125) may include a longitudinal cutout (130). In an example, the longitudinal cutout (130) may run the entire length of the third cylinder (125). In an example, the longitudinal cutout (130) may run a distance shorter than the entire length of the third cylinder (125). During operation, a build material may pass from an interior of the second cylinder (115) to an interior to the third cylinder (125) via the second plurality of holes (120). The build material may then be allowed to accumulate within the interior of the third cylinder (125). A portion of the build material may pass from the interior of the third cylinder (125) to an interior surface of the first cylinder (105) via the longitudinal cutout (130) formed in the third cylinder (125). Deposition of the build material on a build platform may then occur when the build material passes through the first plurality of holes (110) of the first cylinder (105).

In any example presented herein, the 3D printing device (100) may further include a supply tube (135). The supply tube (135) may be coupled and open to the interior of the second cylinder (115) via, for example, an end of the second cylinder (115). In an example, the supply tube (135) provides an amount of build material to the interior of the second cylinder (115).

As described herein, the build material may move from the interior of the second cylinder (115) to the interior of the third cylinder (125), and through the first plurality of holes (110) defined in the first cylinder (105) via the longitudinal cutout (130). To assist the movement of the build material through these cylinders (105, 115, 125), the 3D printing device (100) may include a vibrating device that vibrates the cylinders (105, 115, 125). As the cylinders (105, 115, 125) vibrate, the build material may be kept from being compacted as it passes from one cylinder (105, 115, 125) to another. Additionally, the vibration device may be used to mix the build material before it is deposited onto the build platform by the first cylinder (105).

In any example presented herein, the 3D printing device (100) may include a blower coupled to the supply tube (135). The blower may blow an amount of build material though the supply tube (135) and into the second cylinder (115) in order to facilitate the transfer of build material into the interior of the second cylinder (115). Additionally, the flow of air through the supply tube (135) and into the cylinders (105, 115, 125) may help to agitate the build material so as to prevent the build material from being packed inside the cylinders (105, 115, 125).

As described herein, the three cylinders (105, 115, 125) of the 3D printing device (100) work together to deliver the build material to the surface of the build platform. During operation, a number of gears, motors, and/or rails may be used to pass the cylinders (105, 115, 125) in their configuration across the surface of the build platform. The cylinders (105, 115, 125) may be allowed to pass a certain distance above the build platform and/or a previously-laid layer of build material. As the cylinders (105, 115, 125), and specifically the first cylinder (105), deposits an amount of build material onto the surface of the build platform and/or a previously-laid layer of build material, the first cylinder (105) may also spread the build material evenly so as to form a new layer of build material. To accomplish this, the first cylinder (105) may rotate in a direction counter to the movement of the cylinders (105, 115, 125) across the build platform. By way of an example, if the cylinders (105, 115, 125) pass across the build platform from right to left, the first cylinder (105) may be rotated in a counter-clockwise motion, Such as rotation allows the build material to pass through the first plurality of holes (110). Additionally, the outer surface of the first cylinder (105) that does not have a hole defined therein may serve to spread the build material across the layer. In an example, the pattern of the first plurality of holes (110) defined in the first cylinder (105) may include an offset pattern. That is, a row of holes formed in a line longitudinally down the outer surface may be offset by a second row of holes also formed in a line longitudinally down the outer surface of the first cylinder (105). This creates a pattern where each of the first plurality of holes (110) are followed by a portion of the outer surface of the first cylinder (105) that does not include a hole. This allows for spreading of the build material by the first cylinder (105) after a hole of the first plurality of holes (110) deposits the build material. Consequently, the cylinders (105, 115, 125) described herein act as both a depositor of build material as well as a spreader of the build material, Such an arrangement allows for less complexity in design of the 3D printing device (100) as well as less moving parts. Still further, the arrangement as described may reduce the time used to form a 3D object in the 3D printing device (100). Indeed, by concurrently (i.e., in a single pass of the cylinders (105, 115, 125)) depositing and spreading the build material, the speed is significantly increased compared to implementing a separate spreader and build material depositor. Even still further, the combination of the spreader and depositor into a single unit as described herein allows for less parts used within the 3D printing device (100) reducing the cost of manufacturing and complexity of the 3D printing device (100). Additionally, by combining the spreader and depositor into a single unit, physical area within the 3D printing device (100) may be freed up allowing additional devices to be placed within the housing of the 3D printing device (100). In an example, the cylinders (105, 115, 125) may be followed by a blade or other build material spreading device in order to improve the uniformity of the deposited layer.

Figure 2:
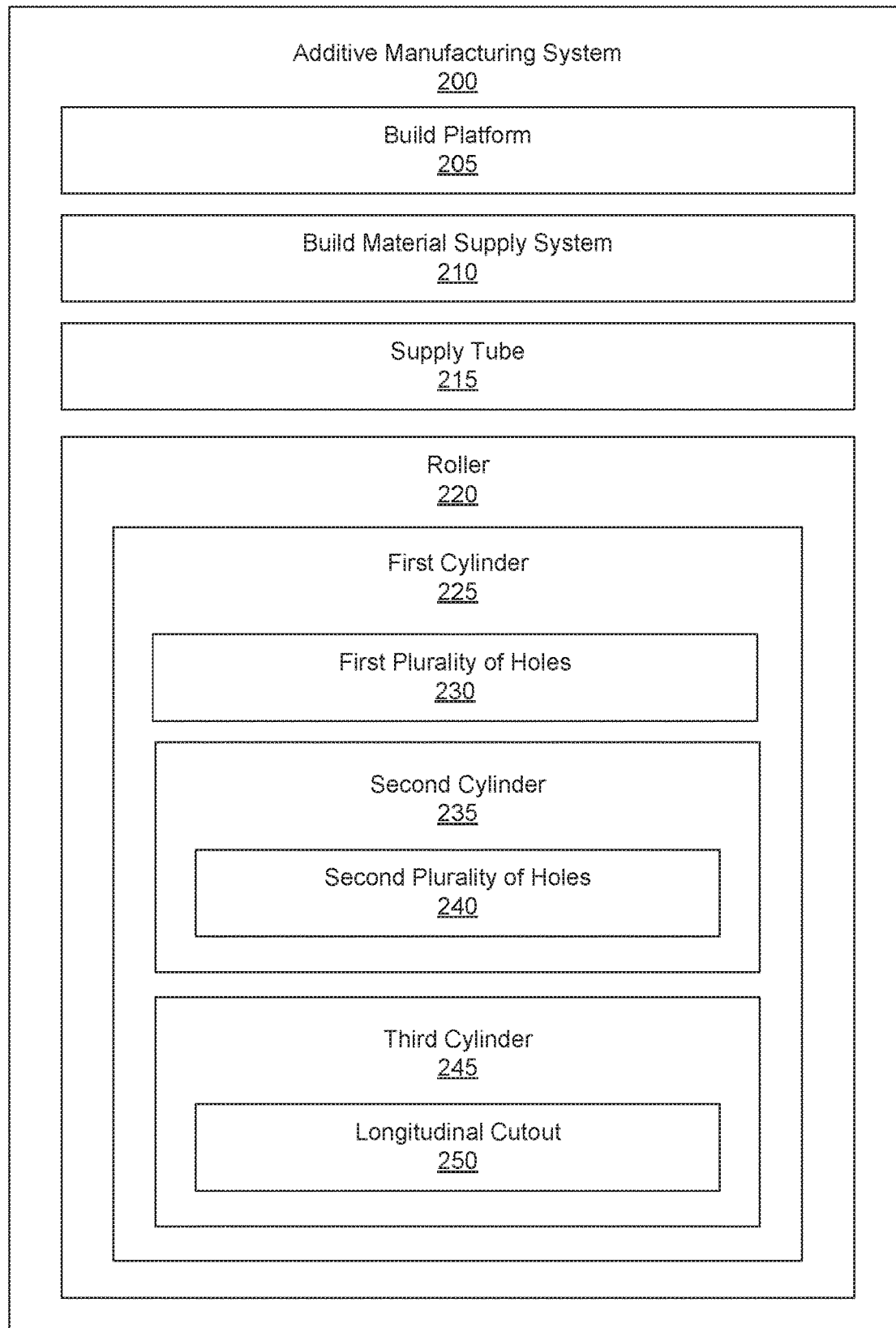
FIG. 2 is a block diagram of an additive manufacturing system according to an example presented herein.

FIG. 2 is a block diagram of an additive manufacturing system (200) according to an example presented herein. In any example presented herein, the additive manufacturing system (200) includes a build platform (205), a build material supply system (210), a supply tube (215), and a roller (220).

The additive manufacturing system (200) may, in any example presented herein, receive digital data describing a 3D object and cause that 3D object to be formed. Formation of the 3D object may be accomplished by digitally rendering the 3D object into a number of layers. The data associated with the individual layers may be used to direct the additive manufacturing system (200) where to deposit build materials and other agents used in the 3D object formation process. By way of example, the agents deposited along with the build material may include light reflective agents, light absorbing agents, fusing agents, binding agents, coloring agents and/or a build material suspension agent, among other types of agents. With the build material placed on the build platform (205), the additive manufacturing system (200) may implement any device to fuse or otherwise coalesce the build material to form the 3D object. Such devices include heating sources as electromagnetic radiation sources. Additionally, the agents described above may be used to induce chemical reactions that coalesce the build material together. By successively building the 3D object layer-by-layer, the additive manufacturing system (200) may form the 3D object over time. Any non-coalesced build material may be removed to reveal the 3D object formed.

The build platform (205) may be any type of surface that may receive an amount of build material from the roller (220) as described herein. In an example, the build platform (205) may move in a vertical direction relative to the roller (220) so as to receive successive layers of build material thereon.

In any example presented herein, the additive manufacturing system (200) may include a build material supply system (210). The build material supply system (210) may supply, via the supply tube (215), an amount of build material to the roller (220). The build material supply system (210) may include a device such as a blower to send the build material through the supply tube (215) and into an interior of the roller (220). In this example, the blower may also be used to agitate the build material within the roller (220) as air passes into and through the interior of the roller (220).

In any example presented herein, the additive manufacturing system (200) may include a roller (220). As described herein, the roller may include a first cylinder (225), a second cylinder (235), and a third cylinder (245). The third cylinder (245) may be placed coaxially and interior to the first cylinder (225). Additionally, the second cylinder (235) may be placed coaxially and interior to both the first cylinder (225) and third cylinder (245).

The second cylinder (235) may include a first plurality of holes (230) to allow a build material to pass from an interior of the second cylinder (235) to an interior of the third cylinder (245). The transfer of build material from the interior of the second cylinder (235) to the interior of the third cylinder (245) may be accomplished through the rotation of the second cylinder (235) and/or the passing of air, via the blower, into the interior of the second cylinder (235).

The third cylinder (245) may include a longitudinal cutout (250). The longitudinal cutout (250) may selectively allow an amount of build material to pass from the interior of the third cylinder (245), via gravity and/or air pressure, to the interior surface of the first cylinder (225).

The first cylinder (225) may include a first plurality of holes (230) defined therein. As described herein, the placement of the first plurality of holes (230) on the surface of the first cylinder (225) may provide for the concurrent deposition of the build material and spreading of the build material.

In any example presented herein, the additive manufacturing system (200) may include a vibration device. The vibration device may be mechanically coupled to the roller (220) so as to impart a vibrating force against or on the roller (220). The vibration device may facilitate the movement and agitation of the build material throughout and within any of the first cylinder (225), second cylinder (235), and third cylinder (245).

In any example presented herein, the additive manufacturing system (200) may include a controller. The controller may process "control build material supply" data, and in response cause the build material to be appropriately positioned on the build platform (205).

The controller may also process manufacturing data that is based on a 3D object model of the 3D object/part to be generated. In response to data processing, the controller may control the operations of the build platform (205), and the roller (220). As an example, the controller may control actuators (not shown) to control various operations of the components of the additive manufacturing system (200).

The controller may be a computing device, a semiconductor-based microprocessor, a central processing unit (CPU), an application specific integrated circuit (ASIC), and/or another hardware device. The controller may be connected to the components of the additive manufacturing system (200) via hardware communication lines, or wirelessly via radio or photonic communication.

The controller may manipulate and transform data, which may be represented as physical (electronic) quantities within the additive manufacturing system (200) registers and memories, in order to control the physical elements to create the 3D object. As such, the controller may be in communication with a data storage device. The data storage device may also be referred to as a computer memory. The data storage device may include data pertaining to a 3D object to be manufactured by the additive manufacturing system (200). The data for the selective delivery of the build material, etc. may be derived from a model of the 3D object to be formed. The data storage device may also include machine readable instructions (stored on a non-transitory computer readable medium) that are to cause the controller to control the amount of build material that is supplied by the roller (220) and the movement of the build platform (205), etc.

The additive manufacturing system (200) may be utilized in any data processing scenario including, stand-alone hardware, mobile applications, through a computing network, or combinations thereof. Further, the additive manufacturing system (200) may be used in a computing network, a public cloud network, a private cloud network, a hybrid cloud network, other forms of networks, or combinations thereof. In one example, the methods provided by the additive manufacturing system (200) are provided as a service over a network by, for example, a third party. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the additive manufacturing system (200) are executed by a local administrator.

Figure 3:
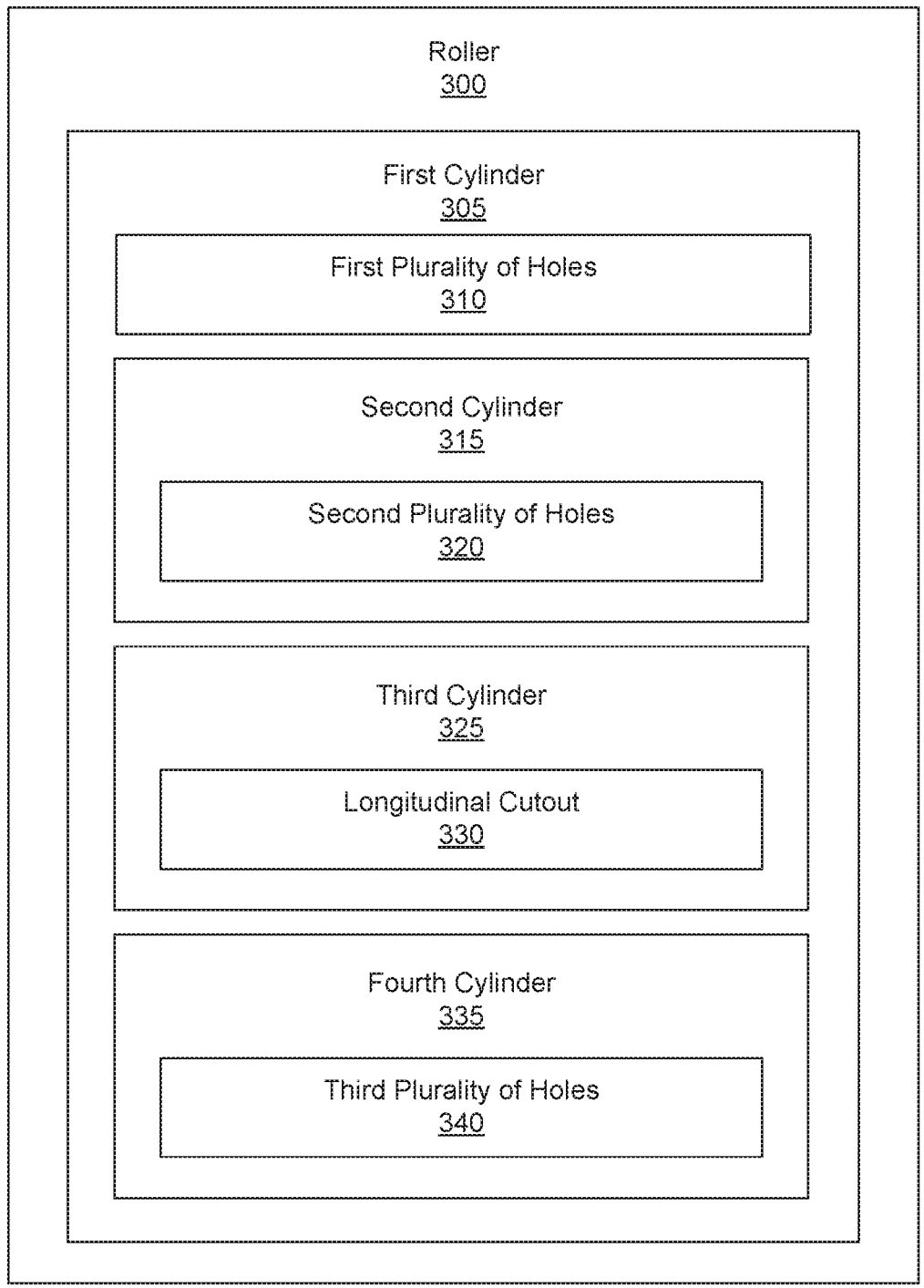
FIG. 3 is a block diagram of a roller according to an example of the principles described herein.

FIG. 3 is a block diagram of a roller (300) according to an example of the principles described herein. The roller (300) may be similar to the roller (FIG. 2, 220) described in connection with FIG. 2. In this example, the roller (300) may include a first cylinder (305), a second cylinder (315), and a third cylinder (325). The second cylinder (315) may include a first plurality of holes (310) to allow a build material to pass from an interior of the second cylinder (315) to an interior of the third cylinder (325). The transfer of build material from the interior of the second cylinder (315) to the interior of the third cylinder (325) may be accomplished through the rotation of the second cylinder (315) and/or the passing of air, via the blower, into the interior of the second cylinder (315).

The third cylinder (325) may include a longitudinal cutout (330). The longitudinal cutout (330) may selectively allow an amount of build material to pass from the interior of the third cylinder (325), via gravity and/or air pressure, to the interior surface of the first cylinder (305).

The first cylinder (305) may include a first plurality of holes (310) defined therein. As described herein, the placement of the first plurality of holes (310) on the surface of the first cylinder (305) may provide for the concurrent deposition of the build material and spreading of the build material.

In addition to the first cylinder (305), second cylinder (315), and third cylinder (325), the roller (300) may include a fourth cylinder (335) interposed coaxially between the first cylinder (305) and the third cylinder (325). Like the first cylinder (305), the fourth cylinder (335) may include a third plurality of holes (340). The build material may pass from the second cylinder (315) to the third cylinder (325) as described herein. The build material may also move from the interior of the third cylinder (325) to an interior surface of the fourth cylinder (335). In this example, the first plurality of holes (310) and third plurality of holes (340) defined in the first cylinder (305) and fourth cylinder (335) respectively, may be used to adjust the amount of build material that is deposited onto the build platform. This adjustment is accomplished by offsetting the openings to the third plurality of holes (340) and first plurality of holes (310) relative to each other. In an example the pattern and placement of the first plurality of holes (310) relative to the third plurality of holes (340) allows build material to pass from the interior of the third cylinder (325) through these sets of holes (first plurality of holes (310) and third plurality of holes (340)) and onto the build platform when the first plurality of holes (310) and third plurality of holes (340) are aligned. However, the amount of build material deposited may be reduced by turning slightly the fourth cylinder (335) relative to the first cylinder (305) so that the sum of the area between the first plurality of holes (310) and third plurality of holes (340) is reduced, thereby creating a relatively smaller hole through which the build material may pass. In an example, the rotation of the first cylinder (305) relative to the fourth cylinder (335) may be accomplished by actuating a motor to finely adjust the alignment of the first plurality of holes (310) and third plurality of holes (340) relative to each other. As such, the amount of build material deposited by the roller (300) may be adjusted. Adjustment of the amount of build material may be done based on a number of considerations including, but not limited to, the average particle sizes of the build material, the minimum and maximum particle sizes of the build material, the coefficients of friction of the build material, the angles of repose of the build material, other mechanical and physical properties of the build material, and the data describing the thickness of the layer of build material to be deposited. All of these factors may be used to determine the final hole size of the combination of the third plurality of holes (340) and first plurality of holes (310).

Figure 4:
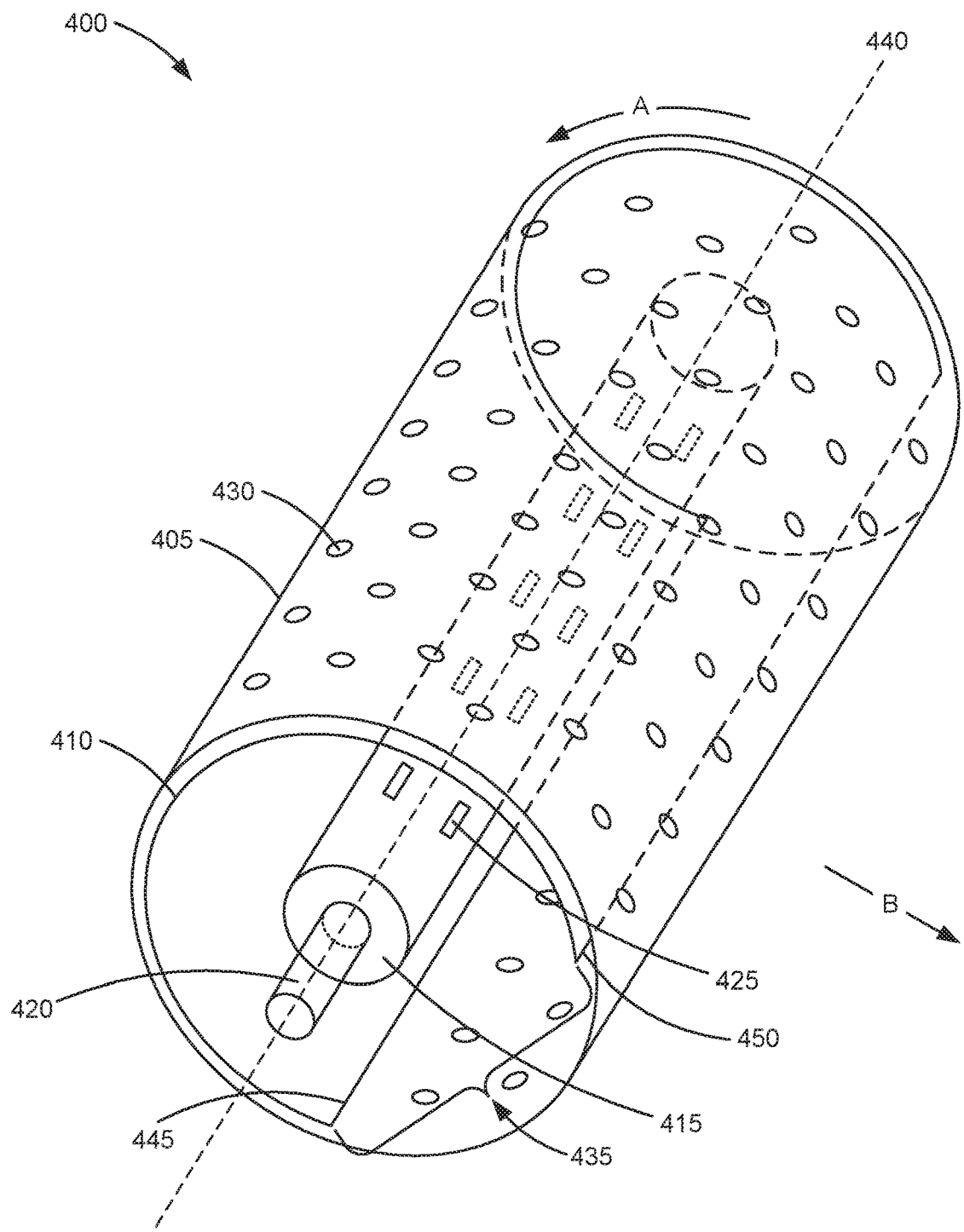
FIG. 4 is an isometric view of a roller used in an additive manufacturing system according to an example of the principles described herein.

FIG. 4 is an isometric view of a roller (400) used in an additive manufacturing system according to an example described herein. The roller (400) may include, similar to that described in connection with FIG. 2, a first cylinder (405), a second cylinder (415), and a third cylinder (410). In this example, the roller (400) may also include a supply tube (420) coupled to an interior of the second cylinder (415).

The first cylinder (405) may include a first plurality of holes (430). The first plurality of holes (430) may include any number of holes arranged to deposit, relatively roughly, to the surface of a build platform and/or a subsequently deposited layer of build material. In the example shown in FIG. 4, the first plurality of holes (430) may be arranged in rows parallel to an axis (440) of the first cylinder (405), second cylinder (415), and/or third cylinder (410). Any number of rows of first plurality of holes (430) may be formed. In the example in FIG. 4, the plurality of rows of first plurality of holes (430) may be offset. In this example, each hole defined in the first cylinder (405) may be circularly matched with a solid surface area of the first cylinder (405). The solid surface area circularly matched with each hole of the first plurality of holes (430) may be used to spread the build material after the matching hole has deposited an amount of build material on the build platform. In an example, the rotation (arrow A) of the first cylinder (405) may rotate against the direction of the roller (400) across the build platform (arrow B). In a direction of the roller (400) across the build platform opposite arrow B, the rotation of the first cylinder (405) may also have a rotational direction opposite that of arrow A.

The roller (400) may include a second cylinder (415). As described herein, the second cylinder (415) may include a second plurality of holes (425) defined therein. The second plurality of holes (425) may provide for the transfer of the build material from an interior of the second cylinder (415) to an interior of the third cylinder (410). Additionally, a supply tube (420) may be coupled to one or both ends of the second cylinder (415) so that a build material may pass through the supply tube (420) and into the interior of the second cylinder (415). In an example, the density of the second plurality of holes (425) may increase from each end of the second cylinder (415) towards the longitudinally center of the second cylinder (415). As described, a blower may pass an amount of build material into the second cylinder (415) and the relatively lower density of the second plurality of holes (425) in the ends of the second cylinder (415) may reduce the passage of the build material from the second cylinder (415) to the third cylinder (410) where relatively higher air pressures are formed.

The roller (400) may include a third cylinder (410). The third cylinder (410) may also include a longitudinal cutout (435). As described herein, the longitudinal cutout (435) may allow an amount of build material to pass from an interior of the third cylinder (410) to access a number of first plurality of holes (430) defined in the first cylinder (405) for deposition of the build material. As shown in FIG. 4, a trailing edge (445) formed by the longitudinal cutout (435) may be directly above the surface of the build platform as the roller (400) traverses the surface of the build platform in the first shown by arrow B. In an example, where the roller (400) traverses across the build platform in a direction opposite of the direction of arrow B, a leading edge (450) formed by the longitudinal cutout (435) may become the leading edge via rotation of the third cylinder (410) in a rotational direction opposite that of arrow A.

In any example presented herein, the roller (400) may include a sensor to detect the level of build material within any of the cylinders (405. 41'0, 415). This sensor (not shown) may be used to control, via a controller, how much additional build material to pass through the supply tube (420) and into the second cylinder (415) so that additional build material may pass, eventually, into the third cylinder (410) and out of the first plurality of holes (430) of the first cylinder (405). Examples of a sensor used to monitor the amount of build material in any of the cylinders (405, 410, 415) may include a seismic sensor, a light sensor, an acoustic sensor, a temperature sensor, a conductive sensor, and a motion sensor, among other types of sensors that may leverage the properties of the build material so that detection of the level of build material may be accomplished. In an example, the sensor may be placed within any of the cylinder (405, 410, 415) and may communicate with the controller via either a wired or wireless connection. In an example, the sensors may be placed outside of the cylinders and detect the level of build material therein via, for example, acoustic and light properties of the build material.

Figure 5:
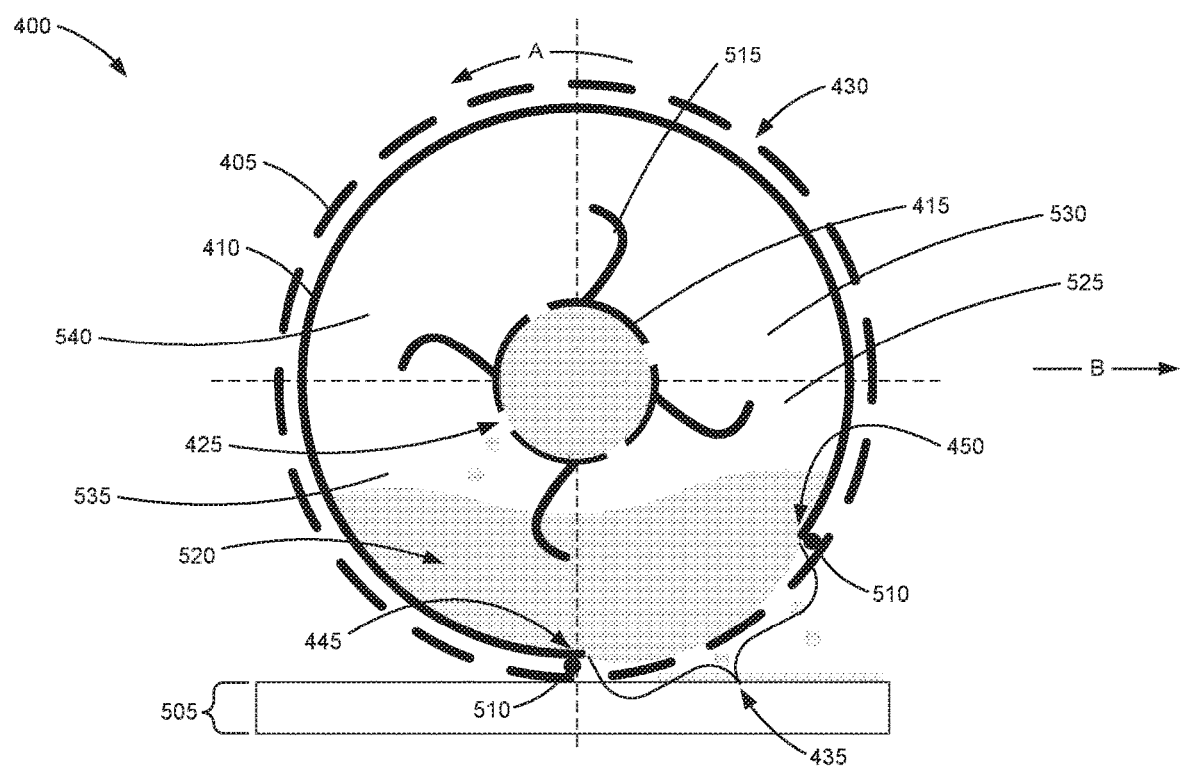
FIG. 5 is a side, cutout view of a roller shown in FIG. 4 according to an example of the principles described herein.

FIG. 5 is a side, cutout view of a roller (400) shown in FIG. 4 according to an example presented herein. As shown in FIG. 5, the second cylinder (415) may also include a number of agitators (515) extending from the exterior surface of the second cylinder (415). The agitators (515) may be used to agitate and add air into an amount of build material (520) built up within the interior of the third cylinder (410). The agitators (515) may take any form such as an auger, a number of flaps, a number of rods, among other shapes and forms. The agitators (515) may prevent the build material (520) from being packed within the third cylinder (410) so that the build material (520) may pass form the interior of the third cylinder (410) and through the first plurality of holes (430) and onto the build platform (505).

In an example, a space between the first cylinder (405) and the third cylinder (410) may include a number of gaskets (510). Any type of gasket may be used. The gaskets (510) may prevent the build material from moving in between the first cylinder (405) and the third cylinder (410). These gaskets (510) may move with the third cylinder (410) when the third cylinder (410) is rotated as described herein.

In the view as shown in FIG. 5, the trailing edge (445) formed by the longitudinal cutout (435) is placed directly above the build platform (505). In this orientation, the longitudinal cutout (435) may be within a second quarter (525) of the circle formed by a side of the first cylinder (405). As such, an area defining a first quarter (530) of the circle formed by the side of the first cylinder (405) is a position between a 12 o'clock position and a 3 o'clock position. Also, an area defining the second quarter (525) of the circle formed by the side of the first cylinder (405) is a position between a 3 o'clock position and a 6 o'clock position. Further, an area defining the third quarter (535) of the circle formed by the side of the first cylinder (405) is a position between a 6 o'clock position and a 9 o'clock position. Also, an area defining a fourth quarter (540) of the circle formed by the side of the first cylinder (405) is a position between a 9 o'clock position and the 12 o'clock position. In an example, the length of the longitudinal cutout (435) may be equal to the length of the second quarter. In an example, the length of the longitudinal cutout (435) may be less than the length of the second quarter.

Figure 6:
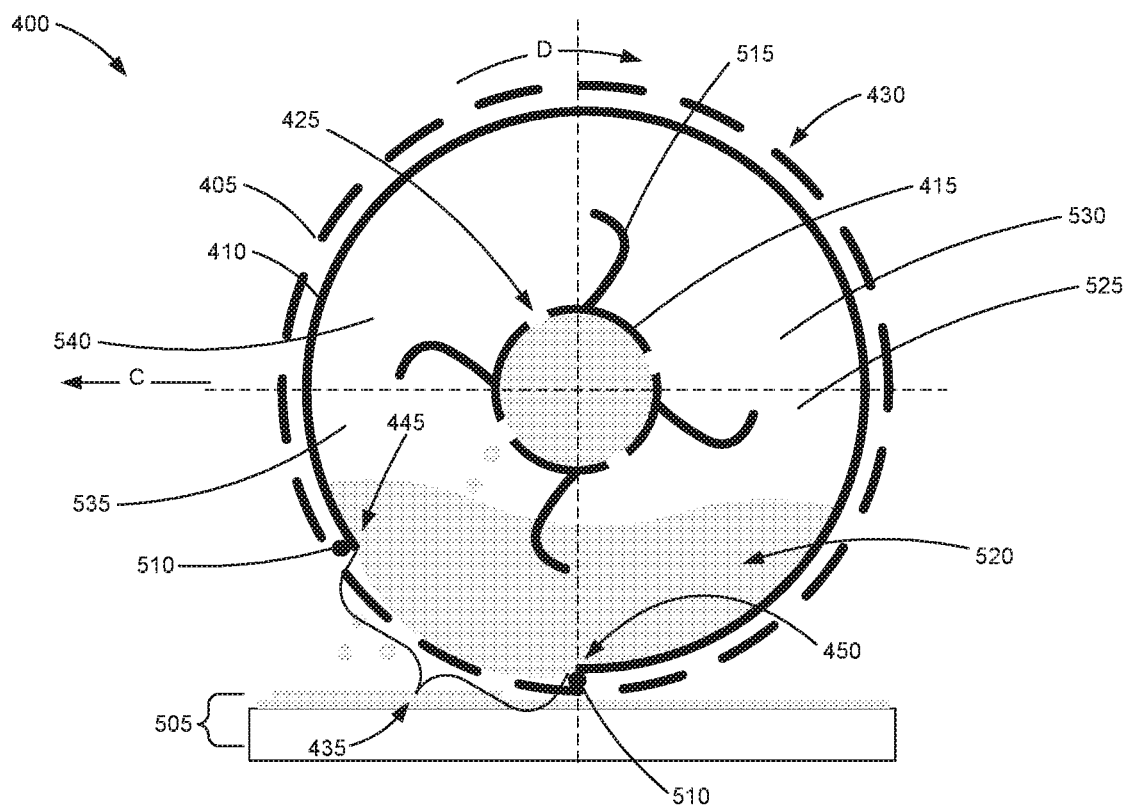
FIG. 6 is a side, cutout view of a roller shown in FIG. 4 according to an example of the principles described herein Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 6 is a side, cutout view of a roller (400) shown in FIG. 4 according to an example presented herein. FIG. 6 shows the roller (400) except that the roller (400) is passing in an opposite direction across the build platform (505) as that show in FIG. 5 according to arrow C. As can be seen the third cylinder (410) may be rotated such that the leading edge (450) is now the trailing edge of the longitudinal cutout (435). FIG. 6 also shows that the direction of rotation of the first cylinder (405) is opposite that shown in FIG. 5 as indicated by arrow D. In this configuration, the longitudinal cutout (435) may be placed within the third quarter of the circle formed by the side of the first cylinder (405). In this example, the third cylinder (410) is rotated into the third quarter of the circle formed by the side of the first cylinder (405) prior to depositing and spreading the build material onto the surface of the build platform (505) and/or a previously laid layer of build material.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the controller of the printing device or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a number of cylinders that concurrently spread and distribute an amount of build material onto the surface of a build platform. Such an arrangement of the cylinders as described allows for less complexity in design of the 3D printing device as well as less moving parts. Still further, the arrangement as described may reduce the time used to form a 3D object in the 3D printing device. Indeed, by concurrently (i.e., in a single pass of the cylinders) depositing and spreading the build material, the speed is significantly increased compared to implementing a separate spreader and build material depositor. Even still further, the combination of the spreader and depositor into a single unit as described herein allows for less parts used within the 3D printing device thereby reducing the cost of manufacturing and complexity of the 3D printing device itself, Additionally, by combining the spreader and depositor into a single unit, physical area within the 3D printing device may be freed up allowing additional devices to be placed within the housing of the 3D printing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A three-dimensional (3D) printing device, comprising:
a first cylinder comprising a first plurality of holes defined therein;
a second cylinder interior and coaxial to the first cylinder comprising a second plurality of holes open to an interior of the first cylinder;
a third cylinder interior to the first cylinder and exterior to the second cylinder, the third cylinder comprising a longitudinal cutout open to the first cylinder; and
a supply tube open to the second cylinder, the supply tube to provide an amount of build material to an interior portion of the second cylinder.

2. The 3D printing device of claim 1, comprising a number of seals to seal a space formed between the first cylinder and the third cylinder except via the longitudinal cutout.

3. The 3D printing device of claim 1, wherein the first plurality of holes defined in the first cylinder comprise a plurality of rows of holes with each row of holes having holes offset from holes of another row to prevent a non-uniform distribution of build material on a surface of a build platform.

4. The 3D printing device of claim 1, wherein the second plurality of holes of the second cylinder vary in diameter based on location along a longitudinal position on the second cylinder.

5. The 3D printing device of claim 4, wherein the diameter of the plurality of holes of the second cylinder increase along a longitudinal axis from a proximal end of the second cylinder to a distal end of the cylinder.

6. The 3D printing device of claim 1, wherein the second cylinder comprises at least one stirring device formed on an exterior surface of the second cylinder.

7. The 3D printing device of claim 6, wherein the at least one stirring device is in the form of an auger.

8. The 3D printing device of claim 1, wherein the third cylinder rotates based on the direction of movement of the third cylinder across a build platform.

9. An additive manufacturing system, comprising:
a build platform;
a build material supply system; and
a roller, comprising:
a first cylinder comprising a first plurality of holes defined therein;
a second cylinder interior and coaxial to the first cylinder comprising a second plurality of holes open to an interior of the first cylinder;
a third cylinder interior to the first cylinder and exterior to the second cylinder, the third cylinder comprising a longitudinal cutout open to the first cylinder;
wherein the build material supply system delivers build material into an interior cavity of the second cylinder via a supply tube.

10. The additive manufacturing system of claim 9, comprising a fourth cylinder comprising a fourth plurality of holes defined therein wherein the fourth cylinder is interior to and coaxial with the first cylinder and exterior to the third cylinder.

11. The additive manufacturing system of claim 10, wherein the fourth plurality of holes and the first plurality of holes interface with each other to adjust the amount of build material exiting the first cylinder.

12. The additive manufacturing system of claim 9, wherein the first cylinder rotates counter to the direction of movement across the build platform.

13. The additive manufacturing system of claim 9, comprising a vibrator to vibrate at least one of the first, second, and third cylinders.

14. The additive manufacturing system of claim 9, comprising a thermal sensor and heater to detect a temperature of build material on the build platform and adjust a temperature of at least the first cylinder to match the temperature of the build material on the build platform.

15. A roller for a three-dimensional additive manufacturing system, comprising:
a replaceable first cylinder comprising a first plurality of holes defined therein;
a second cylinder interior and coaxial to the first cylinder comprising a second plurality of holes open to an interior of the first cylinder;
a third cylinder interior to the first cylinder and exterior to the second cylinder, the third cylinder comprising a first longitudinal cutout open to the first cylinder; and
a fourth cylinder comprising a fourth plurality of holes defined therein wherein the fourth cylinder is interior to and coaxial with the first cylinder and exterior to the third cylinder, the fourth cylinder comprising a third plurality of holes;
wherein a build material supply system delivers build material into an interior cavity of the second cylinder via a supply tube.

16. The 3D printing device of claim 1, wherein the first plurality of holes are arranged in rows parallel to a longitudinal axis of the first cylinder.

17. The 3D printing device of claim 1, wherein the second plurality of holes have a density that increases from each end of the second cylinder toward a longitudinal center of the second cylinder.

18. The 3D printing device of claim 1, further comprising a blower to pass build material through the supply tube and into the second cylinder using air pressure.

19. The 3D printing device of claim 1, wherein the second cylinder comprises a number of agitators extending from an exterior surface of the second cylinder, the agitators to agitate and add air into build material within an interior of the third cylinder.

20. The additive manufacturing system of claim 9, wherein the first cylinder is structured to rotate against a direction that the first roller moves across the build platform.

\* \* \* \* \*